(12) United States Patent
Raman

(10) Patent No.: US 9,288,630 B2
(45) Date of Patent: Mar. 15, 2016

(54) METHOD AND APPARATUS FOR PROVIDING POSITIONING SERVICES USING MULTI-SPACING CLUSTERING

(71) Applicant: Verizon Patent and Licensing Inc., Basking Ridge, NJ (US)

(72) Inventor: Madhusudan Raman, Sherborn, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 229 days.

(21) Appl. No.: 14/064,758

(22) Filed: Oct. 28, 2013

(65) Prior Publication Data

US 2015/0119082 A1    Apr. 30, 2015

(51) Int. Cl.
*G08B 1/08* (2006.01)
*H04W 4/02* (2009.01)

(52) U.S. Cl.
CPC .................................... *H04W 4/028* (2013.01)

(58) Field of Classification Search
None
See application file for complete search history.

(56) References Cited

U.S. PATENT DOCUMENTS

| | | | | |
|---|---|---|---|---|
| 5,801,970 | A * | 9/1998 | Rowland et al. | 703/6 |
| 2004/0150715 | A1 * | 8/2004 | Wilcock | G06Q 30/02 348/143 |
| 2007/0149216 | A1 * | 6/2007 | Misikangas | 455/456.1 |
| 2008/0214205 | A1 * | 9/2008 | Alles | G01S 5/021 455/456.1 |
| 2012/0302252 | A1 * | 11/2012 | Alles | G01S 5/021 455/456.1 |
| 2013/0053056 | A1 * | 2/2013 | Aggarwal | G01S 5/0263 455/456.1 |
| 2013/0096817 | A1 * | 4/2013 | Fauci et al. | 701/411 |
| 2013/0344888 | A1 * | 12/2013 | Dousse | H04W 4/022 455/456.1 |
| 2014/0128093 | A1 * | 5/2014 | Das et al. | 455/456.1 |
| 2014/0243025 | A1 * | 8/2014 | Alsehly et al. | 455/457 |
| 2014/0342752 | A1 * | 11/2014 | Jones et al. | 455/456.1 |
| 2015/0009072 | A1 * | 1/2015 | Nijsure | 342/417 |
| 2015/0052097 | A1 * | 2/2015 | Song | 706/52 |
| 2015/0181387 | A1 * | 6/2015 | Shaw | H04W 24/00 455/456.1 |
| 2015/0181551 | A1 * | 6/2015 | Sonnenburg | 455/456.1 |
| 2015/0204676 | A1 * | 7/2015 | Zhang et al. | 342/417 |

* cited by examiner

*Primary Examiner* — Julie Lieu

(57) ABSTRACT

An approach for providing positioning services using multi-space clustering includes detecting sensor data across a plurality of sensor spaces for a device. The plurality of sensor spaces are associated with respective one or more sensor types. The approach also includes predicting a point propensity for the device to represent location data of the device based on the sensor data, and performing a clustering of the location data across the plurality of sensor spaces to generate a cluster graph of a physical space associated with the sensor data.

18 Claims, 11 Drawing Sheets

METHOD AND APPARATUS FOR PROVIDING POSITIONING SERVICES USING MULTI-SPACING CLUSTERING

BACKGROUND INFORMATION

Location-based services and applications have become increasingly popular among consumers. However, traditional location-based services generally rely on dedicated location sensors to provide positioning information. As a result, service providers face significant technical challenges to providing positioning services that do not rely on dedicated location sensors so that positioning services will continue to operate when dedicated location sensors (e.g., satellite-based location sensors) are not available (e.g., when indoor conditions block reception of location signals). Based on the foregoing, there is a need for an approach for providing positioning services using multi-space clustering of commonly available and non-dedicated sensor data to determine location data.

BRIEF DESCRIPTION OF THE DRAWINGS

Various exemplary embodiments are illustrated by way of example, and not by way of limitation, in the figures of the accompanying drawings in which like reference numerals refer to similar elements and in which.

DESCRIPTION OF THE PREFERRED EMBODIMENT

A method, apparatus, and system for providing positioning services using multi-space clustering are described. In the following description, for the purposes of explanation, numerous specific details are set forth in order to provide a thorough understanding of the present invention. It is apparent, however, to one skilled in the art that the present invention may be practiced without these specific details or with an equivalent arrangement. In other instances, well-known structures and devices are shown in block diagram form in order to avoid unnecessarily obscuring the present invention.

Figure 1A:
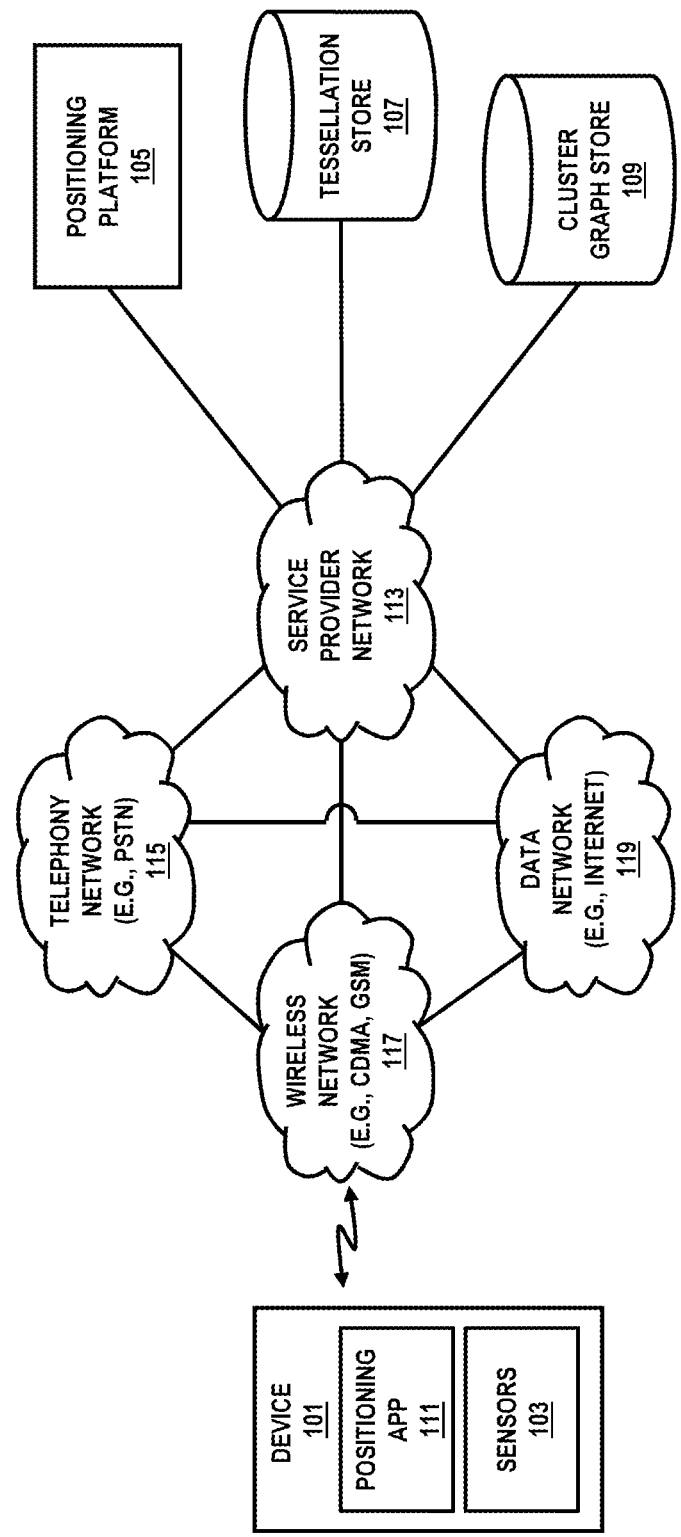
FIG. 1A is a diagram of a system capable of providing positioning services using multi-space clustering, according to one embodiment.

FIG. 1A is a diagram of a system capable of providing positioning services using multi-space clustering, according to one embodiment. Indoor positioning services have historically been a great technical challenge to service providers because dedicated location sensors (e.g., satellite-based location sensors such as GPS, GLONASS, and the like) often do not operate in indoor environments. For example, current approaches to solving indoor navigation problems have mainly relied on substituting traditional location sensors with indoor location receivers which are mounted in indoor environments (e.g., indoor location beacons, indoor signal relays, etc.). This approach, however, requires infrastructure improvements or modifications (e.g., installation of indoor location sensors and other equipment) to operate.

In addition, even after installing indoor location sensors, service providers are faced with the problem of lack of indoor mapping data. Traditional map providers, for instance, often have to obtain floor maps or other maps so that users can see their locations and navigate within indoor environments. However, gathering such indoor mapping data is a daunting task and can be very resource intensive. For example, because of this resource burden, traditional map providers have generally been limited to providing indoor maps for large public places (e.g., shopping malls, tourist attractions, etc.), thereby leaving the vast majority of indoor environments (e.g., office buildings, homes, smaller shops, etc.) unmapped. As a result, users generally have poorer mapping, navigation, and other location-based services available to them while indoors.

To address these problems, a system 100 of FIG. 1 introduces the capability to leverage predictive learning and sensors already available on user devices alongside a consumer configurable mix of on-device and cloud-based computation and/or recall of multi-space clustering of sensor signatures and their anomalies to eliminate the need for floor plans and dedicated indoor positioning sensors and related hardware. In one embodiment, multi-space sensor signatures refers to, for instance, different views of a physical environment as sensed using different sensor types such as: (a) audio and magnetic; (b) contextual and topological; (c) electromagnetic spectrum; and (d) metric views. The system 100 then clusters or segment observed point readings of the multi-space sensor signatures to segment the physical space into regions defined, for instance, by Voronoi polytopes. The system 100 then applies predictive analytics on the Voronoi polytopes to adaptively discover and learn the layout or configuration of a physical space (e.g., indoor space) and provide positioning/navigation services within the space.

In one embodiment, the system 100 provides positioning services (e.g., indoor positioning services) by using a mobile device (e.g., a smartphone device 101) that has standard sensors 103 (e.g., magnetic and audio sensors along with a camera and standard cellular or wireless-based broadband connectivity from a hardware perspective) for deployment of the services. As previously discussed, the system 100 then uses advanced predictive analytics described to provide for learning of navigable routes using a combination of contextual and multi-space sensor readings.

Although various embodiments are described with respect to providing positioning services using multi-space clustering in an indoor environment, it is contemplated that the various embodiments are applicable anywhere traditional location sensors or unavailable or not used. For example, other use scenarios include outdoor navigation where satellite-based location sensors or cell tower location triangulation is available (e.g., when under heavy foliage or in areas with no wireless reception). In other cases, users may avoid activating traditional location-based sensors to reduce battery consumption, and instead use the positioning services described herein. Yet another use case includes, exploring unknown locations such as caves, collapsed buildings, etc. where mapping information and/or traditional location sensors do not operate.

In one embodiment, the system 100 provides semantic, topological, metric, and/or other views of a physical space (e.g., an indoor space such as shopping malls, cruise ships, business campuses/buildings, etc.) determined from, for instance, multi-space clustering and crowdsourcing of user point propensity/location data derived from multi-space sensor data (e.g., sensor data collected from sensors such as microphones, short range wireless receivers, magnetometers, light sensors, etc. that are typically already present in mobile devices). In one embodiment, the system 100 calculates the view of the physical space by determining anomalies present in the location data (e.g., of either individual users or a set of crowdsourced users). These anomalies may indicate, for instance, unused spaces, paths, gathering places, etc. that the system 100 can use to automatically infer or learn a layout or floor plan of the physical space. In one embodiment, the learning or inference of the layout or floor plan is performed using predictive ensemble models as discussed in more detail below. In this way, the system 100 advantageously (1) eliminates a need for a pre-constructed map or floor plan of the space, (2) eliminates a need for external hardware for localization, and (3) provides for realtime availability of positioning services.

In one embodiment, the system 100 populates a multi-dimensional navigational space with sensor data, where each dimension or space of the multi-dimensional navigational space is associated with a different sensor type. By way of example, a multi-dimensional navigational space may include sensor spaces for audio signatures, contextual signatures, electromagnetic spectrum signatures, and/or magnetic signatures. It is contemplated that the sensor types listed for illustration and not for limitation. Accordingly, any sensor or sensor type available at a device can be used according to the various embodiments described herein.

In one embodiment, the system 100 determines a point propensity (e.g., an estimated location) of a device by determining a likely intersection point of the multiple spaces of sensor data. In other words, the system 100 leverages the notion that at any particular point, the sensor signatures across all spaces create a unique and identifiable combination of signatures that can be associated with a particular point in space. For instance, at a Point A in space, it is expected that the combination of, for instance, audio signature, contextual signature, electromagnetic signature, and/or magnetic signature capture by a user device will be unique to Point A. As a result, under the various embodiments of the approaches described herein, traditional or dedicated location sensors (e.g., Global Positioning Satellite (GPS) signals or Bluetooth Low Energy (BLE)) environments and supporting external hardware infrastructure (e.g., BLE beacons, satellites, etc.) are not necessary for localization of a device while achieving expected positioning accuracy from 2.5 meters down to 0.1 meters (e.g., depending on the sensor types used).

In one embodiment, the system 100 collects location data from multiple devices (e.g., device 101) and over various periods of time (e.g., via crowdsourcing) to aggregate a set of location data for a given physical space or environment. For example, the location data can be generated according to the example point propensity processes described above using sensor data collected by the sensors 103 (e.g., microphones, short range wireless receivers, light sensors, magnetometers, barometers, etc.) of the device 101. In embodiment, the positioning platform 105 them performs a clustering of the data set to segment the physical space. By way of example, the clustering and segmentation of the physical space can be performed using Voronoi polytopes so that the Voronoi polytopes represent three-dimensional cells or regions that comprise the entirety of interior volume of the physical space (e.g., a building).

In one embodiment, the positioning platform 105 translates the Voronoi polytopes into N-dimensional Delaunay tessellations to represent the structure of the physical space. The positioning platform 105 stores the Delaunay tessellations in the tessellation store 107. In one embodiment, all or a portion of the tessellations may be cached to the device 101 from the tessellation store 107 and/or streamed from the tessellation store 107 to the device 101 as needed.

In one embodiment, the positioning platform 105 may also generate a cluster graph that represents the physical space and the location data and/or traces. By way of example, the cluster graph can be overlaid on the tessellations and/or the representations of the Voronoi polytopes resulting from the clustering and stored in the cluster graph store 109. In one embodiment, the cluster graph provides a contextual view of collected location data to show discovered features such as: (a) paths through the physical space, (b) areas where users congregate or remain, and/or (c) other anomalies of the data set. As discussed, these anomalies are discovered using predictive ensemble models that can automatically detect the anomalies. In one embodiment, the models can also assign semantic meaning to the anomalies. For example, discovered paths between multiple levels in a physical space may represent a stairway, a pathway through one corner may represent a doorway, unused spaces may represent walls or other obstructions, etc. These anomalies are then used as to determine a floor plan or layout of a physical space without needing a previously drawn map.

In one embodiment, the positioning platform 105 can predict or discover anomalies (e.g., paths from A to B, areas of no use, stay points, etc.) in the multidimensional navigation space by leveraging both inductive and deductive reasoning based on various predictive models. In one embodiment, the models are ensemble models comprising multiple models of multiple types (e.g., experiential models such as neural networks, regression models, etc.). In one embodiment, the models adhere to the Predictive Modeling Markup Language (PMML) standard. By way of example, the ensemble models of the system 100 support a combination of data-driven insight and expert knowledge into a single and powerful decision strategy. Neural network models, for instance, encapsulate "experiential" rules used by experts to provide discovery of location anomalies and features. Then predictive analytics augments the experiential rules based on an ability to automatically recognize patterns in data not obvious to the expert eye. As a result, the ensemble model approach described herein uses more than one model to arrive at a consensus classification or impact scoring for a given set of user location data.

In one embodiment, the positioning platform 105 can continuously monitor collected location data to determine changes within the monitored physical environment. For example, new construction or rearrangements of fixtures can create new pathways or result in new obstructions. The positioning platform 105 can process the location data collected after the changes to construct a more current floor plan that reflects the changes. Accordingly, the positioning platform 105 is adaptive to a changing physical space so that uses can be automatically provided with up to date information about a physical space.

Figure 1B:
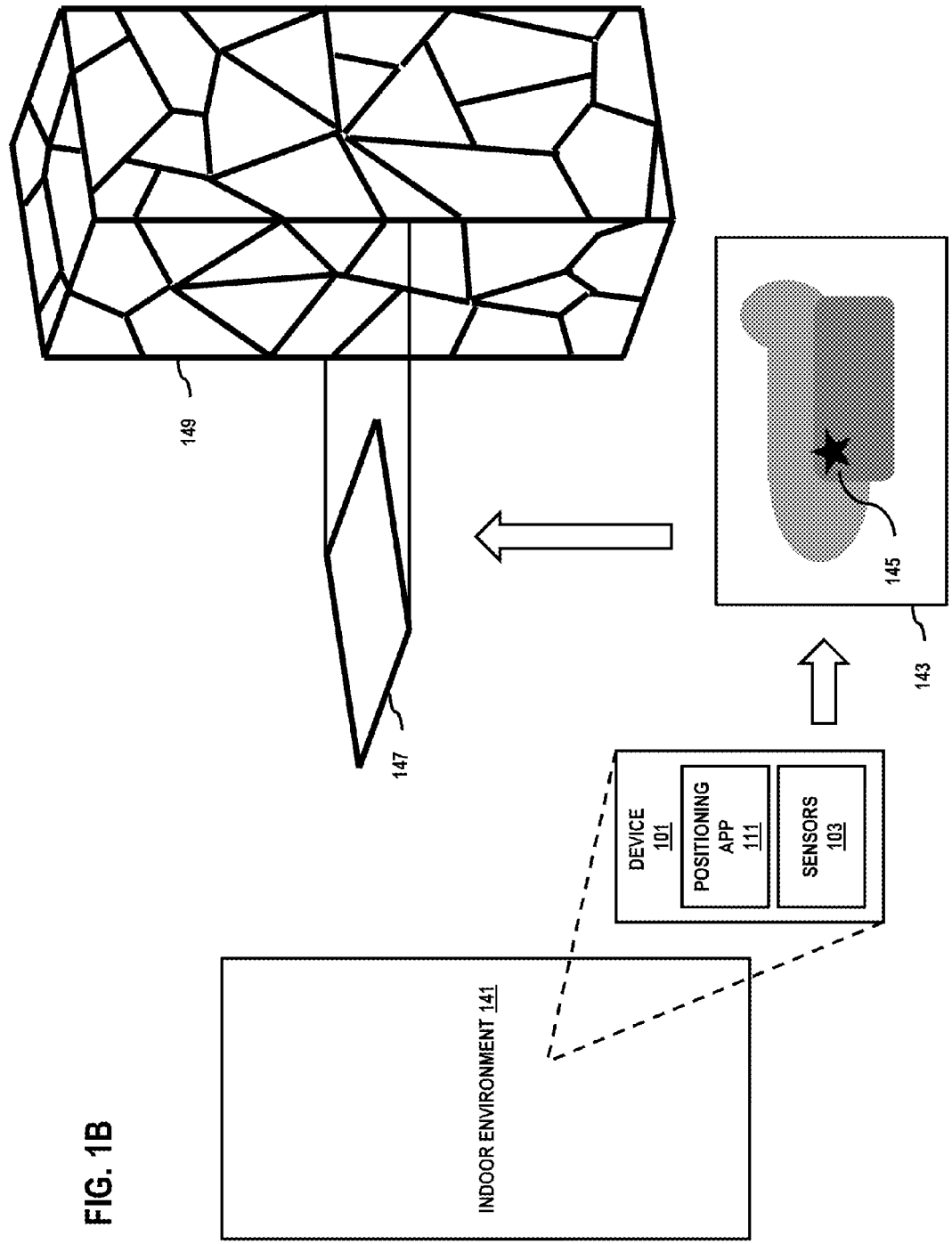
FIG. 1B is a diagram of providing positioning service using multi-space clustering in an indoor environment, according to one embodiment.

FIG. 1B is a diagram of providing positioning service using multi-space clustering in an indoor environment, according to one embodiment. The example use case of FIG. 1B is discussed in combination with the components of FIG. 1A. For example, a user (e.g., via a device 101) in an indoor environment 141 (e.g., a building or cruise ship) is authenticated by the positioning platform 105 (or another separate identity server) to determine eligibility to receive positioning services. Once authenticated, the device 101 contacts a public facing component or server of the positioning platform 105 to obtain positioning services. In one embodiment, authentication enables the device 101 to access a real-time "listener" application programming interface (API) of the positioning platform 105. The listener API, for instance, fields requests from the device 101 for positioning information. In one embodiment, the positioning platform 105 is optimized for real-time requests for guidance information for navigating within a physical space (e.g., an indoor space). In one embodiment, the positioning platform 105 could refer to a locally cached multi-space cluster graph or could retrieve or generate the cluster graph on the fly from the cluster graph store 109.

As shown in FIG. 1B, device 101 is located within the indoor environment 141. The device 101 employs an array of built-in sensors 103 to obtain multi-space sensor data (e.g., audio signature, contextual signature, electromagnetic signature, magnetic signature, etc.) to create, for instance, a multi-space topological representation 143 of the sensor data. In this case, the sensor data represents a point reading that is processed by the positioning platform 105 to determine a likely point within the indoor environment 141 that most likely represents the intersection point of the multi-space sensor data (e.g., indicated by the star 145 in the representation 143). Moreover, in this example, the representation 143 corresponds to a cross-section 147 of the indoor space, and therefore, the star 145 indicates a location of the device 101 within one plane of the indoor space. The positioning platform 105 can then use the multi-space sensor to further perform a signature match to estimate a vertical position of the device 101 within the three-dimensional indoor environment.

In one embodiment, if requested by the user or device 101 (e.g., to obtain indoor mapping information), the positioning platform 105 accesses the tessellation store 107 to compute a tessellation 149 for the indoor environment 141. The tessellation 149, for instance, can be used to render a graphical representation of the indoor environment 141 on the user's device 101 along with a location of the device 101 determined from the point reading of the device 101's multi-space sensor data.

In one embodiment, the device 101 may execute a positioning application 111 to perform all or a portion of various embodiments of the processes described herein. For example, depending on the resources available at device 101, the positioning application 111 can perform functions such as computing the Voronoi spaces for a given physical. It is contemplated that the positioning application 111 and the positioning platform 105 can interact according to a client-server architecture to share functions, data, etc. associated with providing positioning service using multi-space clusters.

For illustrative purposes, the positioning platform 105, the device 101, and/or the positioning application 111 have connectivity to the service provider network 113 via one or more of networks 115-119. In one embodiment, networks 113-119 may be any suitable wireline and/or wireless network, and be managed by one or more service providers. For example, telephony network 115 may include a circuit-switched network, such as the public switched telephone network (PSTN), an integrated services digital network (ISDN), a private branch exchange (PBX), or other like network. Wireless network 117 may employ various technologies including, for example, code division multiple access (CDMA), enhanced data rates for global evolution (EDGE), general packet radio service (GPRS), mobile ad hoc network (MANET), global system for mobile communications (GSM), Internet protocol multimedia subsystem (IMS), universal mobile telecommunications system (UMTS), etc., as well as any other suitable wireless medium, e.g., microwave access (WiMAX), wireless fidelity (WiFi), satellite, and the like. Meanwhile, data network 119 may be any local area network (LAN), metropolitan area network (MAN), wide area network (WAN), the Internet, or any other suitable packet-switched network, such as a commercially owned, proprietary packet-switched network, such as a proprietary cable or fiber-optic network.

Although depicted as separate entities, networks 113-119 may be completely or partially contained within one another, or may embody one or more of the aforementioned infrastructures. For instance, the service provider network 113 may embody circuit-switched and/or packet-switched networks that include facilities to provide for transport of circuit-switched and/or packet-based communications. It is further contemplated that networks 113-119 may include components and facilities to provide for signaling and/or bearer communications between the various components or facilities of system 100. In this manner, networks 113-119 may embody or include portions of a signaling system 7 (SS7) network, or other suitable infrastructure to support control and signaling functions.

Figure 2:
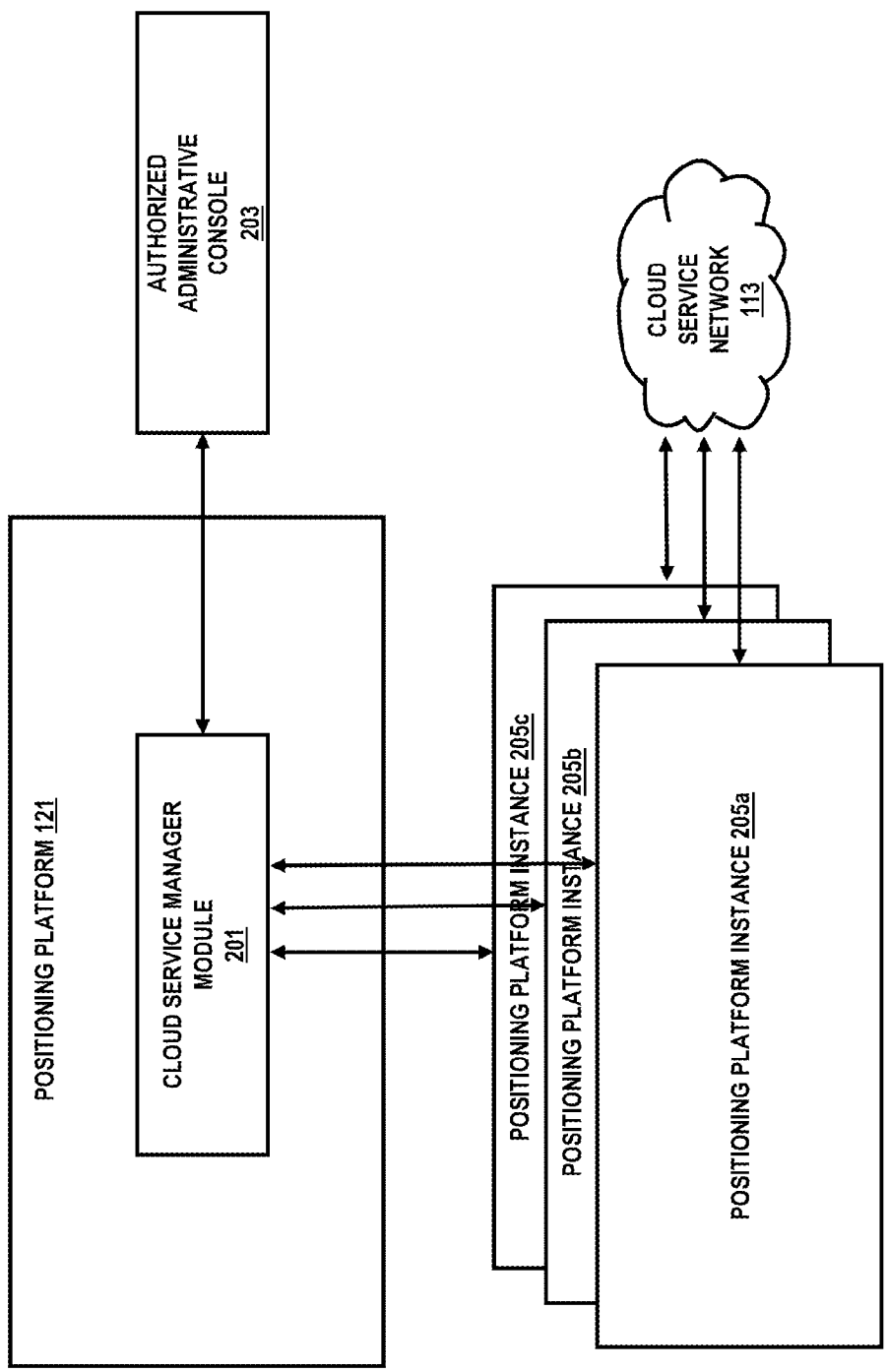
FIG. 2 is a diagram of a system utilizing a positioning platform over a cloud network, according to one embodiment.

FIG. 2 is a diagram of a system utilizing a positioning platform over a cloud network, according to one embodiment. In one embodiment, the positioning platform 105 can be instantiated as a cloud service. For example, channel partners and enterprises can deploy the service to a variety of environments include, e.g., shopping malls, cruise ships, business campus buildings, or other equivalent indoor environments. In one embodiment, the service may be provided as an on-premise solution or an at-large cloud-based solution. In a cloud-based embodiment, the positioning platform 105 is controlled by a cloud service manager module 201. The authorized administrative console 203 is used to access the cloud service manager module 201 to use the cloud service manager module 201 to create instances 205a-205c (also collectively referred to as instances 205) of the positioning platform 105 for a channel partner, enterprise customer, etc.

The cloud service manager module 201 generates an instance 205 of the positioning platform 105 on demand associated with a channel partner. Each instance 205 of the positioning platform 105 gives the channel partner requesting access through the cloud network (e.g., cloud service 113) the ability to manage the services provided. These services include positioning services using multi-space clustering.

Figure 3:
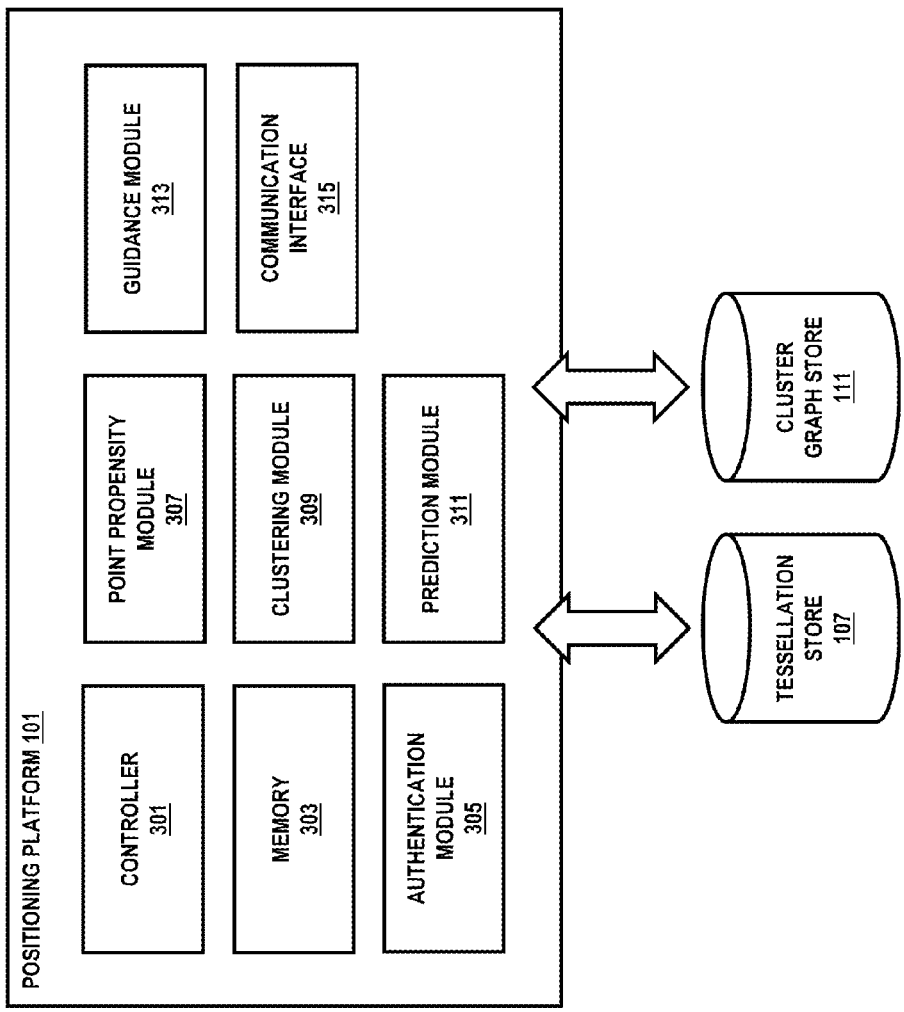
FIG. 3 is a diagram of a positioning platform, according to one embodiment.

FIG. 3 is a diagram of a positioning platform, according to one embodiment, according to one embodiment. By way of example, the positioning platform 105 includes one or more components for providing positioning services using multi-space clustering. It is contemplated that the functions of these components may be combined in one or more components or performed by other components of equivalent functionality. For example, functions as such as authentication, clustering, Voronoi computation, predictive analytics, etc. can be performed by network side components or even on the device 101 itself (e.g., via the positioning application 111).

In this embodiment, the positioning platform 105 includes a controller 301, a memory 303, an authentication module 305, a point propensity module 307, a clustering module 309, a prediction module 311, a guidance module 313, and a communication interface 315. In one embodiment, the positioning platform 105 also has access to the tessellation store 107 and the cluster graph store 109.

The controller 301 may execute at least one algorithm (e.g., stored at the memory 303) for executing functions of the positioning platform 105. For example, the controller 301 may interact with the authentication module 305, authentication user access to the positioning services of the positioning platform 105. In one embodiment, the authentication module 305 may be implemented as an independent identity server. For example, the authentication module 305 can ensure that users have valid subscriptions for using the user. On the other hand, if the positioning services are configured for open access, no authentication may be needed.

Once a user or device 101 is authenticated, the point propensity module 307 can monitor for user requests for positioning information. The point propensity module 307, for instance, is available via API that listens for request from the device 101 for determining a point reading. In one embodiment, the device 101 can collect or measure multi-space sensor data (e.g., across a variety of sensor types) and submit the multi-space sensor data to the point propensity module 307 to estimate a point reading or location of the device 101 based on the sensor signatures indicated in the sensor data. For example, the point propensity module 307 will determine a likely intersection point that matches the sensor signatures measured by the device, and this point represents a likely location of the device.

In one embodiment, the point propensity module 307 can compile or aggregate a set of location data from multiple devices 101 to generate a location data set. The clustering module 309 can then process the location data set to perform multi-space clustering. In one embodiment, the clustering module 309 uses, for instance, a k-means clustering method on the location data set. By way of example, k-means clustering partitions n observations of location data (e.g., location data points for devices 101 as determined by the point propensity module 307) into k clusters where each observation is grouped into the cluster with the nearest mean or seed. The mean serves as a prototype of the cluster. In one embodiment, the clustering module 309 partitions the location data set into Voronoi polytopes.

Once the location data is clustered into Voronoi polytopes, the clustered data (e.g., in the form of a cluster graph) is fed to the prediction module 311. In one embodiment, the prediction module 311 uses predictive analytics to discover and classify anomalies in the location data set to identify features (e.g., paths, non-used spaces, gathering points, etc.) within the physical space. For example, the prediction module 311 can use a scoring engine to identify potential features or anomalies. The prediction module 311 can, for instance, evaluate the cluster graph to identify edges between nodes as potential paths through a physical space as well as non-used spaces where there are no devices appear to be located or travel through. In one embodiment, the patterns created by the traveled edges (e.g., based on frequency of observations) and well as the lack of location data at certain locations can be used to infer the presence of specific features in the environment.

More specifically, in one embodiment, the prediction module 311 uses ensemble predictive models to calculate a predicted score for classifying anomalies in the location data into identifiable features, layouts, floor plans, etc. of a physical space (e.g., an indoor space). For example, each feature (e.g., a doorway, wall, hallway, staircase, etc.) may have specific classification criteria that emerge from observations and predictive analysis of anomalies in the data set. These criteria are then used as the basis for identifying the features in a previously unknown or unmapped space. For example, the prediction module 311 combines linear regression and neural network models into a predictive scorecard. In one embodiment, the predictive models leverage a PMML cloud-based engine such as the Adaptive Decision and Predictive Analytics (ADAPA) engine. In one embodiment, the model's data dictionary contains all the definitions for data fields (input variables) used in the model. The dictionary also specifies the data field types and value ranges. In PMML, the content of a "Data Field" element defines the set of values which are considered to be valid or default parameters. Each PMML model also contains one "Mining Schema" which lists fields used in the model.

In one embodiment, the neural network model represent a model trained by the use of a back propagation algorithm to identity features in a physical space. For example, a neural network model is composed of an input layer, one or more hidden layers and an output layer. In one embodiment, the model used by the prediction module 511 is composed of an input layer containing many input nodes, multiple hidden layers with neurons, and an output layer with output neurons. All input nodes are connected to all neurons in the hidden layer via connection weights. By the same extent, all neurons in the hidden layer are connected to the output neuron in the output layer. Each neuron receives one or more input values, each coming via a network connection, and are contained in the corresponding neuron element. Each connection of the element neuron stores the ID of a node it comes from and the weight. A bias weight coefficient or a width or a radial basis function unit may also be stored as an attribute of the neuron element.

In one embodiment, after the prediction module 311 determines a floor plan or configuration of a physical space (e.g., an indoor space), the guidance module 313 can use point readings from a particular device 101 to assist the device 101 or a user of the device 101 in navigating the physical space. For example, the configuration or layout of a space may be represented as a tessellation stored in the tessellation database 107 for caching or retrieval by the device 101. The guidance module 313 can then use the tessellation to render a view of representation of the space along with the device 101's estimated location within the space. In one embodiment, the guidance module 313 can present the guidance or mapping information for the physical space as a variety of views. For example, these views include a metric view, a topological view, a semantic view, etc.

Figure 4:
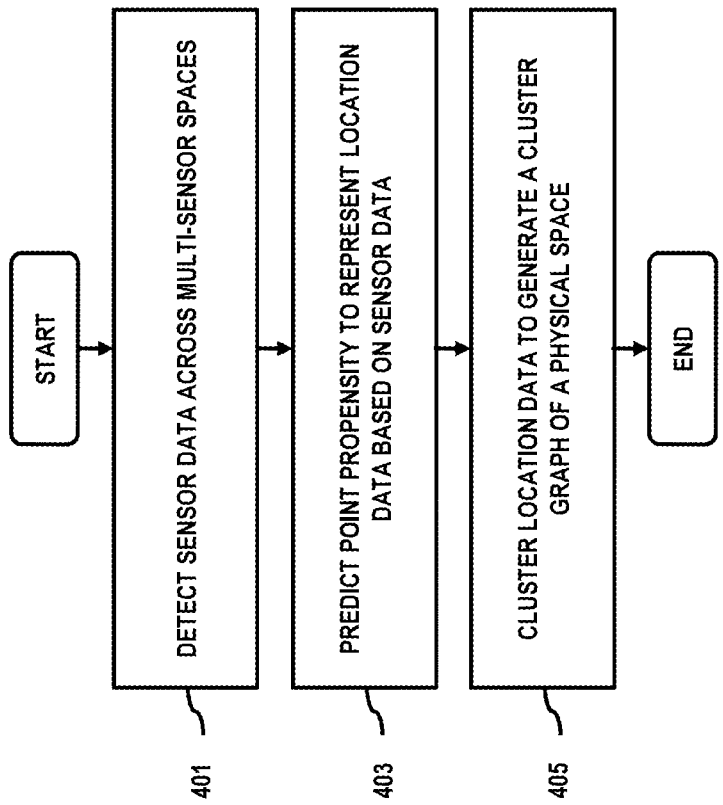
FIG. 4 is a flowchart of a process for providing positioning services using multi-space clustering, according to one embodiment.
Figure 10:
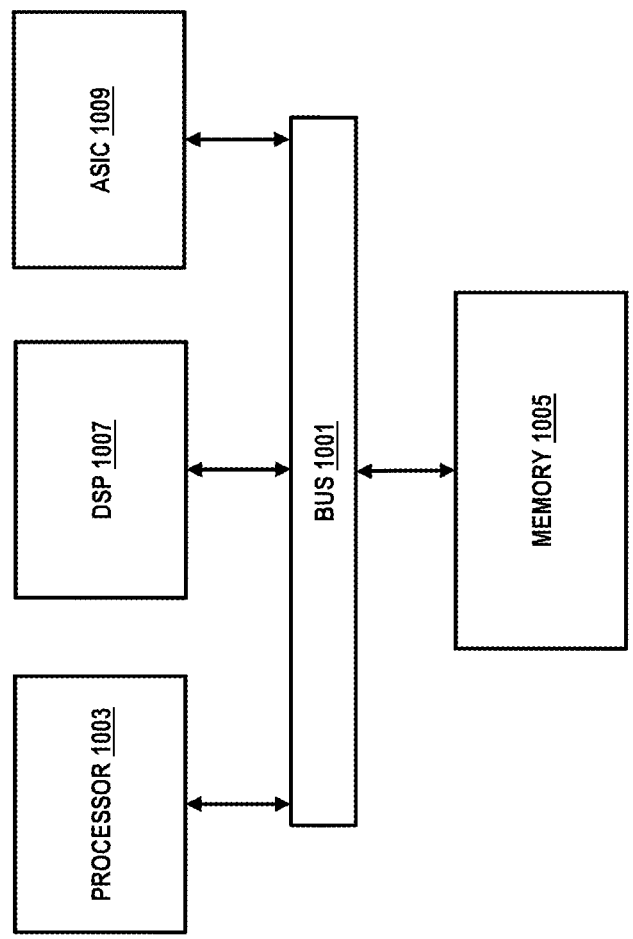
FIG. 10 is a diagram of a chip set that can be used to implement various exemplary embodiments.

FIG. 4 is a flowchart of a process for providing positioning services using multi-space clustering, according to one embodiment. In one embodiment, the positioning platform 105 performs the process 400 and is implemented in, for instance, a chip set including a processor and a memory as shown in FIG. 10. In addition or alternatively, the positioning application 111 may perform all or a portion of the process 400.

In step 401, the positioning platform 105 detects sensor data across a plurality of sensor spaces for a device. In one embodiment, the plurality of sensor spaces are associated with respective one or more sensor types. For example, the multiple sensor spaces can be overlaid to represent a physical space across multiple dimensions with each sensor space representing one dimension. By way of example, the sensor types include a magnetometer, a microphone, a camera, a light meter, a short range wireless receiver, or a combination thereof. The list of sensor types is provided by way of illustration and not limitation. Accordingly, it is contemplated that the positioning platform 105 may use any sensor type that is installed or made available on a device 101. For example, some devices 101 may have infrared sensors, barometers, etc. that can be used to sense a surrounding environment and become a part of a multi-dimensional sensor space.

In step 403, the positioning platform 105 predicts a point propensity for the device to represent location data of the device based on the sensor data. In one embodiment, the positioning platform 105 determines a likely intersection point of the plurality of sensor spaces to predict the point propensity for the device. The point propensity is used, for instance, to localize a set of sensor readings to a specific point in space. As previously discussed, the positioning platform 105, in one embodiment, bases its localization mechanism on the concept that each point in space is associated with a unique combination or intersection of sensor signatures. Accordingly, as the number of dimensions of sensors increases or the local specificity of individual sensor signatures increases, so does the accuracy of the positioning information generated by the positioning platform 105.

In step 405, the positioning platform 105 performs a clustering of the location data across the plurality of sensor spaces to generate a cluster graph of a physical space associated with the sensor data. In one embodiment, the positioning platform 105 performs the clustering using one or more Voronoi polytopes using k-means clustering. The clustering, for instance, enables the positioning platform 105 to provide a framework or organizing and processing a potentially large collection of location data into more manageable clusters to reduce processing burdens and increase efficiency. This processing efficiency enables Voronoi clustering to be performed locally on modern mobile devices 101 (e.g., smartphones) which have traditionally had relatively limited processing capabilities, thereby avoiding a need for more extensive computing requirements and related infrastructure.

Figure 5:
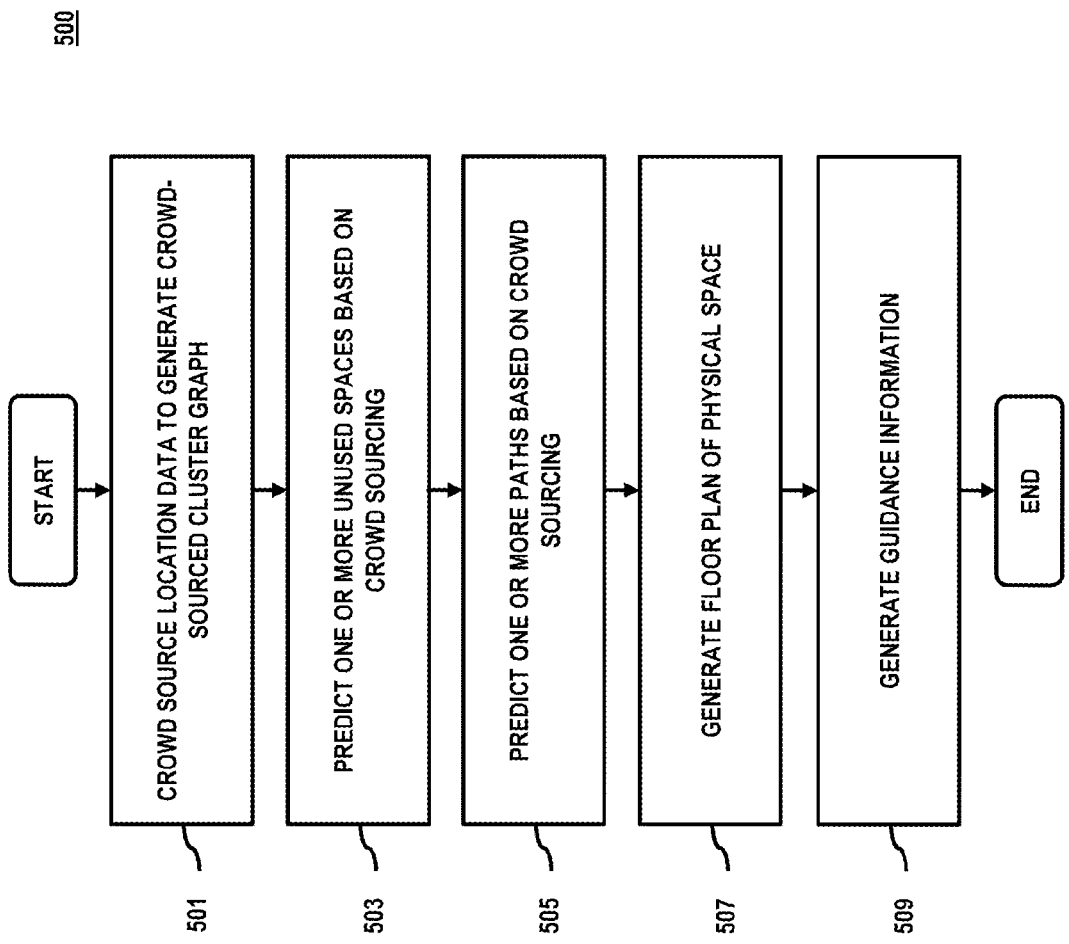
FIG. 5 is a flowchart of a process for using crowd-sourced location data generated from multi-space clustering, according to one embodiment.

FIG. 5 is a flowchart of a process for using crowd-sourced location data generated from multi-space clustering, according to one embodiment. In one embodiment, the positioning platform 105 performs the process 500 and is implemented in, for instance, a chip set including a processor and a memory as shown in FIG. 10. In addition or alternatively, the positioning application 111 may perform all or a portion of the process 500.

In step 501, the positioning platform 105 performs a crowd-sourcing of the location data in combination with other location data determined for one or more other devices within the physical space over one or more time periods. Because the positioning platform 105 is able to determine a device location or point propensity with non-location specific sensors (e.g., GPS sensors), the positioning services of the positioning platform 105 can be widely deployed to existing mobile devices 101 for collecting point readings and location data from a potentially vast array of previously unmapped environments (e.g., building interiors, cruise ships, etc.). This ease of deployment can enable the positioning platform 105 to collect and crowd-source location data from a large community of devices to quickly populate cluster graphs various physical environments. For example, a large or extensive location data set enables the positioning platform 105 to more accurately perform its predictive analytics to discover data anomalies and the environmental features associated with those anomalies.

For example, in step 503, the positioning platform 105 predicts one or more unused spaces within the physical space based on the crowd-sourcing, the location data, the other location data, or a combination thereof. More specifically, the positioning platform 105 applies predictive models to score and classified sensor data that meet conditions for classification as a feature such as a whether an area of a physical space is unused. Unused, for instance, refers to areas or regions (e.g., represented by Voronoi polytopes) of the interior volume of the physical space that have little or no location traces. These unused areas can represent obstructions or physical features that obstruct or prevent user movement. Based on the characteristics of the sensor signatures (e.g., electromagnetic anomalies), the positioning platform 105 can further predict the nature of the feature or obstruction (e.g., whether the obstruction is a wall, a table, etc.).

In step 505, the positioning platform 105 predicts one or more paths within the physical space based on the crowd-sourcing, the location data, the other location data, or a combination thereof. Similar to the predictive analytics used to determine unused spaces described in step 503, the positioning platform 105 can apply predictive models to determine what paths are observed between various points within the physical space are taken by users. The identified paths can be then be scored by the predictive models to determine suitability for use as recommended paths for guiding or navigating users within the space.

In step 507, the positioning platform 105 determines or generates a floor plan of the physical space based on the one or more unused spaces, the one or more paths, the cluster graph, or a combination thereof. In one embodiment, the positioning platform 105 can use the predicted features (e.g., paths, unused spaces, etc.) to predict an overall layout, floor plan, or metric view of the physical space. Because of the dynamic nature of collected point readings, the positioning platform 105 can continuously update the floor plan to reflect changes (e.g., construction, rearrangement, etc.) of the physical space.

In step 509, the positioning platform 105 generates guidance information for navigating within the physical space based on the cluster graph. In one embodiment, the positioning platform 105 is able to leverage the paths, layouts, features, etc. determined in the steps above to provide guidance information to users even in physical spaces where no traditional map previously existed. For example, the positioning platform 105 can combine device localization within a physical environment (e.g., via point propensity determination form multi-space sensor data) with learned physical features (e.g., layouts, floor plans, paths, etc.) to deliver navigation guidance information.

Figure 6:
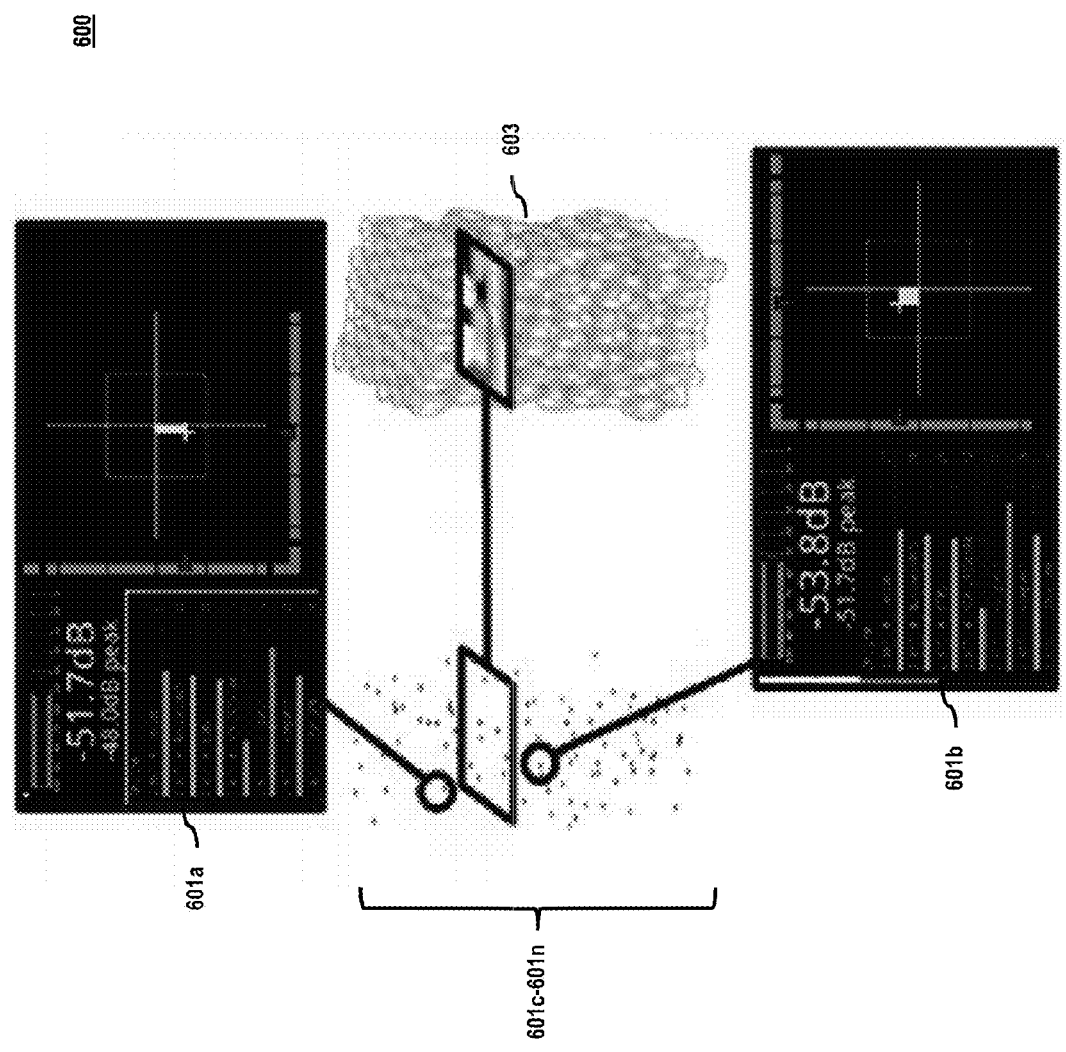
FIG. 6 is a diagram illustrating collecting sensor data for multi-space clustering, according to one embodiment.

FIG. 6 is a diagram illustrating collecting sensor data for multi-space clustering, according to one embodiment. The example 600 of FIG. 6 shows a close-up view of indoor point readings 601a-601n (also collectively referred to as point readings 601) collected by the positioning platform 105 from sensor APIs of devices 101 associated with different users across various points in time. The point readings include electromagnetic signatures (e.g., point readings 601a and 601b), but may also include signatures from any other sensor type available at the devices 101. For example, the devices 101 may also supply point readings 601 that are magnetic and audio cluster readings, contextual plane readings that are based on visual recognition via a camera sensor, and EMS readings. The positioning platform 105 can cluster or partition these readings into Voronoi polytopes 603 that represent an interior volume of a corresponding physical space (e.g., an indoor environment).

Figure 7:
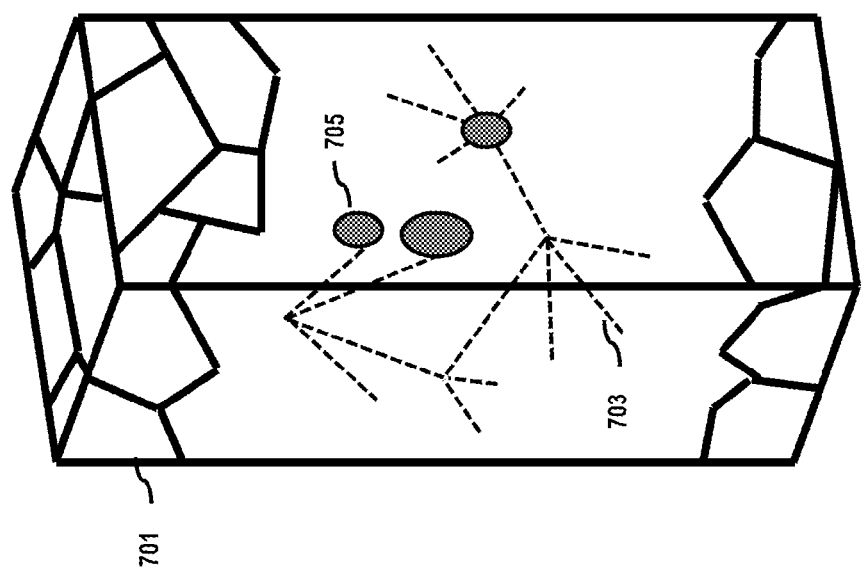
FIG. 7 is a diagram of a cluster graph, according to one embodiment.

FIG. 7 is a diagram of a cluster graph, according to one embodiment. In one embodiment, the point readings 601 of FIG. 6 can be used to create a cluster graph 701 of FIG. 7. For example, the localized point readings 601 from the devices 101 form an input for scoring classification to identify potential features or anomalies by the predictive analytics of the positioning platform 105. As previously discussed, the predictive analytics use PMML-based ensemble classification models. In one embodiment, the positioning platform 105 performs a mapping between a tessellation that represents the physical space, the multi-space cluster graph 701, and the output predictive classification to populate cached positioning responses that are retrievable by the user.

FIG. 7 illustrates a simplified cluster graph 701 that presents only a limited number location traces 703 and detected anomalies 705. In actual practice, the number of location traces 703 or associated point readings 601 can be a vastly greater number that can grow over time. Accordingly, the number of location traces 703 can create a vast intricate web of paths, unused spaces, etc. that can be identified using the predictive analytics of the positioning platform 105, thereby resulting in a learned mapping of the physical space without requiring known floor plans or traditional maps.

Figure 8:
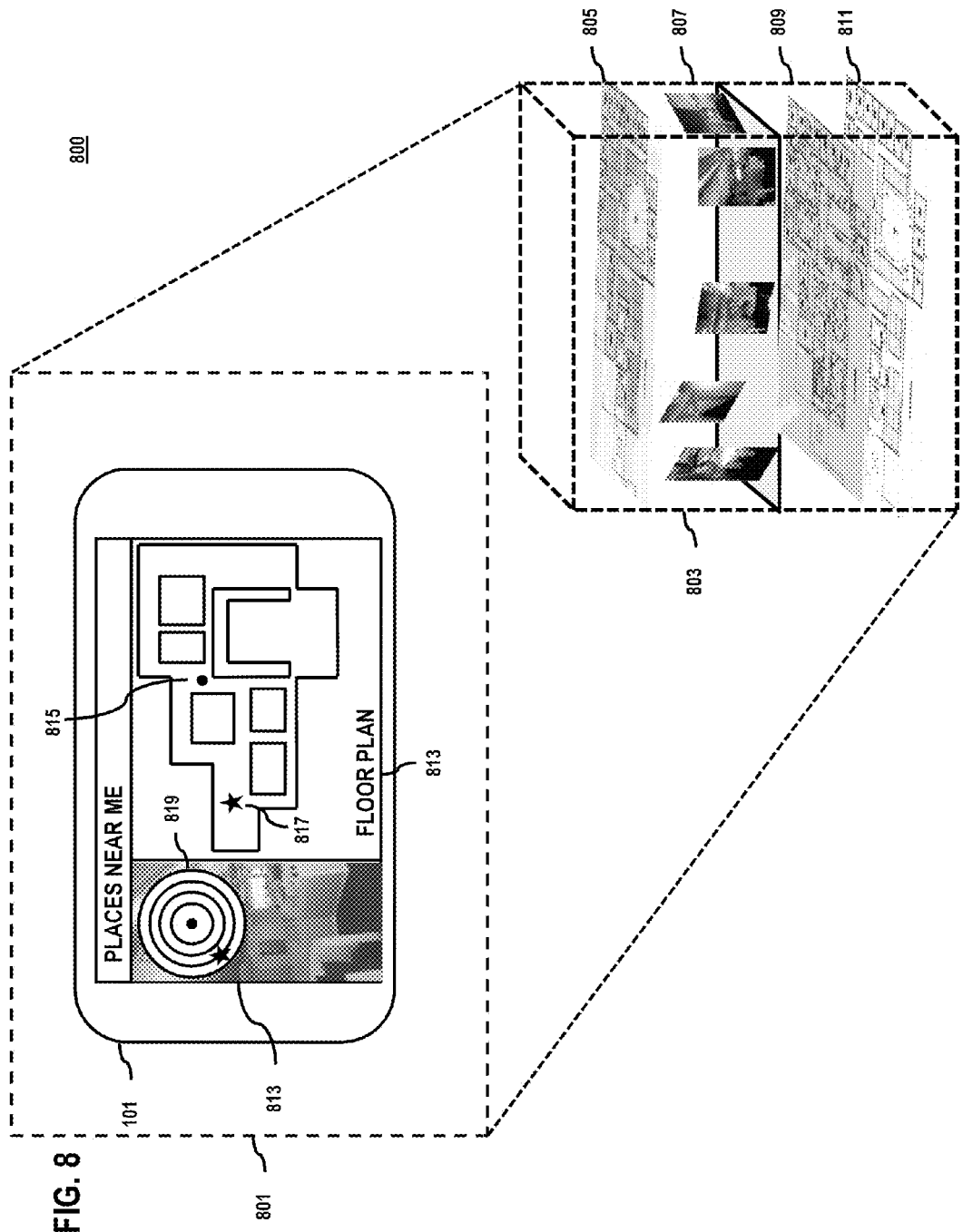
FIG. 8 is a diagram of a user interface used in the processes of FIGS. 4 and 5, according to one embodiment.

FIG. 8 is a diagram of a user interface used in the processes of FIGS. 4 and 5, according to one embodiment. In the example 800 of FIG. 8, a device 101 is within a physical space 801 (e.g., an indoor environment) and is using the positioning services of the positioning platform 105 to navigate within the physical space 801. The physical space 801 is sensed by the device 101 and represented as a multi-dimensional navigational space 803 comprising audio/magnetic space 805, contextual/topological space 807, electromagnetic spectrum space 809, and metric space 811. For example, the audio/magnetic space 805 depicts a topology of the physical space 801 is determined from audio signatures and magnetic signatures measured from the surrounding environment.

The contextual/topological space 807 represents visual information (e.g., windows, doors, furnishings, etc.) that can be recognized from visual sensor data (e.g., camera sensor data). The electromagnetic spectrum space 809 is determined from readings from wireless receivers (e.g., cellular receivers, Wi-Fi receivers, Bluetooth receivers, etc.) that can be used to create a view of the electromagnetic environment of the physical space 801. The metric space 811 represents a physical layout or floor plan of the physical space 801. The metric space 811, for instance, can be determined applying predictive analytics on sensor information to infer physical features present in the environment.

Based on the point readings of the device 101 and the multi-dimensional space 803, the device 101 (e.g., via a positioning application 111) can present a user interface 813 that provides a floor plan 815 or layout of the physical space 801. The user interface 813 can also present a current location 815 of the device 101 as well as a location 817 of nearby places of interest as estimated by the positioning platform 105. In one embodiment, the user interface 813 may include a user interface element 819 that presents a radar-like representation of the device 101's location in relation the places of interest to further assist a user in navigating within the physical space 801.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

The processes described herein for providing positioning services using multi-space clustering can be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 9:
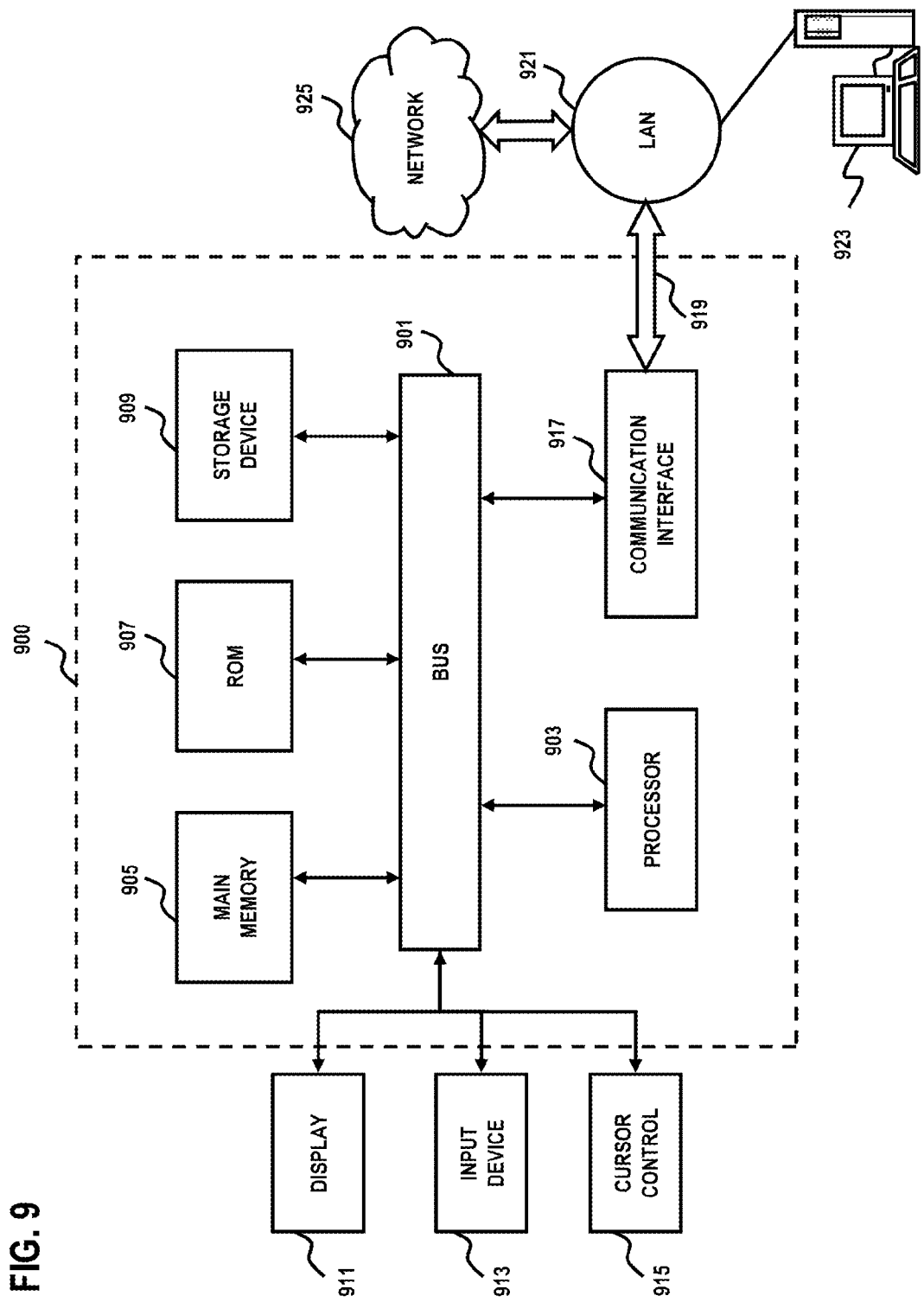
FIG. 9 is a diagram of a computer system that can be used to implement various exemplary embodiments.

FIG. 9 illustrates computing hardware (e.g., computer system) upon which an embodiment according to the invention can be implemented. The computer system 900 includes a bus 901 or other communication mechanism for communicating information and a processor 903 coupled to the bus 901 for processing information. The computer system 900 also includes main memory 905, such as random access memory (RAM) or other dynamic storage device, coupled to the bus 901 for storing information and instructions to be executed by the processor 903. Main memory 905 also can be used for storing temporary variables or other intermediate information during execution of instructions by the processor 903. The computer system 900 may further include a read only memory (ROM) 907 or other static storage device coupled to the bus 901 for storing static information and instructions for the processor 903. A storage device 909, such as a magnetic disk or optical disk, is coupled to the bus 901 for persistently storing information and instructions.

The computer system 900 may be coupled via the bus 901 to a display 911, such as a cathode ray tube (CRT), liquid crystal display, active matrix display, or plasma display, for displaying information to a computer user. An input device 913, such as a keyboard including alphanumeric and other keys, is coupled to the bus 901 for communicating information and command selections to the processor 903. Another type of user input device is a cursor control 915, such as a mouse, a trackball, or cursor direction keys, for communicating direction information and command selections to the processor 903 and for controlling cursor movement on the display 911.

According to an embodiment of the invention, the processes described herein are performed by the computer system 900, in response to the processor 903 executing an arrangement of instructions contained in main memory 905. Such instructions can be read into main memory 905 from another computer-readable medium, such as the storage device 909. Execution of the arrangement of instructions contained in main memory 905 causes the processor 903 to perform the process steps described herein. One or more processors in a multi-processing arrangement may also be employed to execute the instructions contained in main memory 905. In alternative embodiments, hard-wired circuitry may be used in place of or in combination with software instructions to implement the embodiment of the invention. Thus, embodiments of the invention are not limited to any specific combination of hardware circuitry and software.

The computer system 900 also includes a communication interface 917 coupled to bus 901. The communication interface 917 provides a two-way data communication coupling to a network link 919 connected to a local network 921. For example, the communication interface 917 may be a digital subscriber line (DSL) card or modem, an integrated services digital network (ISDN) card, a cable modem, a telephone modem, or any other communication interface to provide a data communication connection to a corresponding type of communication line. As another example, communication interface 917 may be a local area network (LAN) card (e.g.

for Ethernet™ or an Asynchronous Transfer Mode (ATM) network) to provide a data communication connection to a compatible LAN. Wireless links can also be implemented. In any such implementation, communication interface 917 sends and receives electrical, electromagnetic, or optical signals that carry digital data streams representing various types of information. Further, the communication interface 917 can include peripheral interface devices, such as a Universal Serial Bus (USB) interface, a PCMCIA (Personal Computer Memory Card International Association) interface, etc. Although a single communication interface 917 is depicted in FIG. 9, multiple communication interfaces can also be employed.

The network link 919 typically provides data communication through one or more networks to other data devices. For example, the network link 919 may provide a connection through local network 921 to a host computer 923, which has connectivity to a network 925 (e.g. a wide area network (WAN) or the global packet data communication network now commonly referred to as the "Internet") or to data equipment operated by a service provider. The local network 921 and the network 925 both use electrical, electromagnetic, or optical signals to convey information and instructions. The signals through the various networks and the signals on the network link 919 and through the communication interface 917, which communicate digital data with the computer system 900, are exemplary forms of carrier waves bearing the information and instructions.

The computer system 900 can send messages and receive data, including program code, through the network(s), the network link 919, and the communication interface 917. In the Internet example, a server (not shown) might transmit requested code belonging to an application program for implementing an embodiment of the invention through the network 925, the local network 921 and the communication interface 917. The processor 903 may execute the transmitted code while being received and/or store the code in the storage device 909, or other non-volatile storage for later execution. In this manner, the computer system 900 may obtain application code in the form of a carrier wave.

The term "computer-readable medium" as used herein refers to any medium that participates in providing instructions to the processor 903 for execution. Such a medium may take many forms, including but not limited to non-volatile media, volatile media, and transmission media. Non-volatile media include, for example, optical or magnetic disks, such as the storage device 909. Volatile media include dynamic memory, such as main memory 905. Transmission media include coaxial cables, copper wire and fiber optics, including the wires that comprise the bus 901. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the embodiments of the invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

FIG. 10 illustrates a chip set 1000 upon which an embodiment of the invention may be implemented. Chip set 1000 is programmed to securely transmit payments and healthcare industry compliant data from mobile devices lacking a physical TSM and includes, for instance, the processor and memory components described with respect to FIG. 9 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip. Chip set 1000, or a portion thereof, constitutes a means for performing one or more steps of FIGS. 4 and 5.

In one embodiment, the chip set 1000 includes a communication mechanism such as a bus 1001 for passing information among the components of the chip set 1000. A processor 1003 has connectivity to the bus 1001 to execute instructions and process information stored in, for example, a memory 1005. The processor 1003 may include one or more processing cores with each core configured to perform independently. A multi-core processor enables multiprocessing within a single physical package. Examples of a multi-core processor include two, four, eight, or greater numbers of processing cores. Alternatively or in addition, the processor 1003 may include one or more microprocessors configured in tandem via the bus 1001 to enable independent execution of instructions, pipelining, and multithreading. The processor 1003 may also be accompanied with one or more specialized components to perform certain processing functions and tasks such as one or more digital signal processors (DSP) 1007, or one or more application-specific integrated circuits (ASIC) 1009. A DSP 1007 typically is configured to process real-world signals (e.g., sound) in real time independently of the processor 1003. Similarly, an ASIC 1009 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 1003 and accompanying components have connectivity to the memory 1005 via the bus 1001. The memory 1005 includes both dynamic memory (e.g., RAM, magnetic disk, writable optical disk, etc.) and static memory (e.g., ROM, CD-ROM, etc.) for storing executable instructions that when executed perform the inventive steps described herein to controlling a set-top box based on device events. The memory 1005 also stores the data associated with or generated by the execution of the inventive steps.

While certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements.

What is claimed is:

1. A method comprising:
   detecting sensor data across a plurality of sensor spaces for a device, wherein the plurality of sensor spaces are associated with respective one or more sensor types;
   determining a plurality of sensor signatures per sensor type;
   determining a likely intersection point of the plurality of sensor spaces to predict a point propensity for the device and to represent location data of the device based on the sensor data, wherein the likely intersection point matches the sensor signatures; and
   performing a clustering of the location data across the plurality of sensor spaces to generate a cluster graph of a physical space associated with the sensor data.

2. A method of claim 1, further comprising:
   performing the clustering using one or more Voronoi polytopes.

3. A method comprising:
   detecting sensor data across a plurality of sensor spaces for a device, wherein the plurality of sensor spaces are associated with respective one or more sensor types;
   determining a likely intersection point of the plurality of sensor spaces to predict a point propensity for the device and to represent location data of the device based on the sensor data;
   performing a clustering of the location data across the plurality of sensor spaces to generate a cluster graph of a physical space associated with the sensor data; and
   performing a crowd-sourcing of the location data in combination with other location data determined for one or more other devices within the physical space over one or more time periods.

4. A method of claim 3, further comprising:
   predicting one or more unused spaces within the physical space based on the crowd-sourcing, the location data, the other location data, or a combination thereof.

5. A method of claim 3, further comprising:
   predicting one or more paths within the physical space based on the crowd-sourcing, the location data, the other location data, or a combination thereof.

6. A method of claim 5, further comprising:
   determining a floor plan of the physical space based on the one or more unused spaces, the one or more paths, the cluster graph, or a combination thereof.

7. A method of claim 1, further comprising:
   generating guidance information for navigating within the physical space based on the cluster graph.

8. A method of claim 1, wherein the one or more sensor types include a magnetometer, a microphone, a camera, a light meter, a short range wireless receiver, or a combination thereof.

9. An apparatus comprising a processor configured to:
   detect sensor data across a plurality of sensor spaces for a device, wherein the plurality of sensor spaces are associated with respective one or more sensor types;
   determine a plurality of sensor signatures per sensor type;
   determine a likely intersection point of the plurality of sensor spaces to predict a point propensity for the device and to represent location data of the device based on the sensor data, wherein the likely intersection point matches the sensor signatures; and
   perform a clustering of the location data across the plurality of sensor spaces to generate a cluster graph of a physical space associated with the sensor data.

10. An apparatus of claim 9, wherein the apparatus is further configured to:
    perform the clustering using one or more Voronoi polytopes.

11. An apparatus comprising a processor configured to:
    detect sensor data across a plurality of sensor spaces for a device, wherein the plurality of sensor spaces are associated with respective one or more sensor types;
    determine a likely intersection point of the plurality of sensor spaces to predict a point propensity for the device and to represent location data of the device based on the sensor data;
    perform a clustering of the location data across the plurality of sensor spaces to generate a cluster graph of a physical space associated with the sensor data; and
    perform a crowd-sourcing of the location data in combination with other location data determined for one or more other devices within the physical space over one or more time periods.

12. An apparatus of claim 11, wherein the apparatus is further configured to:
    predict one or more unused spaces within the physical space based on the crowd-sourcing, the location data, the other location data, or a combination thereof.

13. An apparatus of claim 11, wherein the apparatus is further configured to:
    predict one or more paths within the physical space based on the crowd-sourcing, the location data, the other location data, or a combination thereof.

14. An apparatus of claim 13, wherein the apparatus is further configured to:
    determine a floor plan of the physical space based on the one or more unused spaces, the one or more paths, the cluster graph, or a combination thereof.

15. An apparatus of claim 9, wherein the apparatus is further configured to:
    generate guidance information for navigating within the physical space based on the cluster graph.

16. A system comprising:
    a positioning platform configured to detect sensor data across a plurality of sensor spaces for a device, wherein the plurality of sensor spaces are associated with respective one or more sensor types; to determine a plurality of sensor signatures per sensor type; to determine a likely intersection point of the plurality of sensor spaces to predict a point propensity for the device and to represent location data of the device based on the sensor data, wherein the likely intersection point matches the sensor signatures; and to perform a clustering of the location data across the plurality of sensor spaces to generate a cluster graph of a physical space associated with the sensor data.

17. A system of claim 16, wherein the positioning platform is further configured to perform the clustering using one or more Voronoi polytopes.

18. A system comprising:
    a positioning platform configured to detect sensor data across a plurality of sensor spaces for a device, wherein the plurality of sensor spaces are associated with respective one or more sensor types; to determine a likely intersection point of the plurality of sensor spaces to predict a point propensity for the device and to represent location data of the device based on the sensor data; to perform a clustering of the location data across the plurality of sensor spaces to generate a cluster graph of a physical space associated with the sensor data; and to perform a crowd-sourcing of the location data in combination with other location data determined for one or more other devices within the physical space over one or more time periods.

\* \* \* \* \*